(12) United States Patent
Ingerslew et al.

(10) Patent No.: US 6,733,879 B2
(45) Date of Patent: May 11, 2004

(54) ADHESIVE-BACKED LABEL AND PROCESS FOR PRODUCING THE SAME

(75) Inventors: John Ingerslew, County of St. Charles, MO (US); Paul F. Schmit, O'Fallon, MO (US)

(73) Assignee: Data2 Incorporated, St. Peters, MO (US)

( * ) Notice: Subject to any disclaimer, the term of this patent is extended or adjusted under 35 U.S.C. 154(b) by 37 days.

(21) Appl. No.: 10/022,640

(22) Filed: Dec. 17, 2001

(65) Prior Publication Data

US 2003/0113500 A1 Jun. 19, 2003

(51) Int. Cl.[7] .................................................. B32B 7/12
(52) U.S. Cl. ........................ 428/354; 283/81; 428/192; 428/343; 428/345; 428/355; 428/356
(58) Field of Search ................................. 428/192, 343, 428/345, 353, 355 R, 356, 354, 355; 283/81

(56) References Cited

U.S. PATENT DOCUMENTS

| | | | | |
|---|---|---|---|---|
| 6,386,590 B1 | * | 5/2002 | Fabel | 283/62 |
| 6,461,706 B1 | * | 10/2002 | Freedman | 428/343 |

OTHER PUBLICATIONS

Adhesive Guide,http://www.pointil.com/resources/adhesive.htm, pp. 1–7, Aug. 18, 2003, See p. –4.*

* cited by examiner

*Primary Examiner*—Nasser Ahmad
(74) *Attorney, Agent, or Firm*—Polster, Lieder, Woodruff & Lucchesi, L.C.

(57) ABSTRACT

A label has a face sheet and below the face sheet a layer of cold flow adhesive. The margin of the face sheet lies outwardly beyond the margin of the cold flow adhesive, thus creating a peripheral region that is initially devoid of cold flow adhesive. Preferably, an undersurface of the face sheet has on it a firm adhesive, to one broad surface of which a polymer film is adhered, the cold flow adhesive being adhered to the other broad surface of the film. The web is formed by applying a strip of transfer adhesive to a release agent on the extended liner, die cutting the adhesive strip to form adhesive patches and an adhesive matrix surrounding the patches; removing the matrix from the liner, then applying an outer strip over the adhesive patches, with the outer strip being formed of the material for the face sheets, die cutting the outer strip around, but outwardly from, the peripheries of the patches to form face sheets and another matrix. The face sheets are ultimately printed.

3 Claims, 4 Drawing Sheets

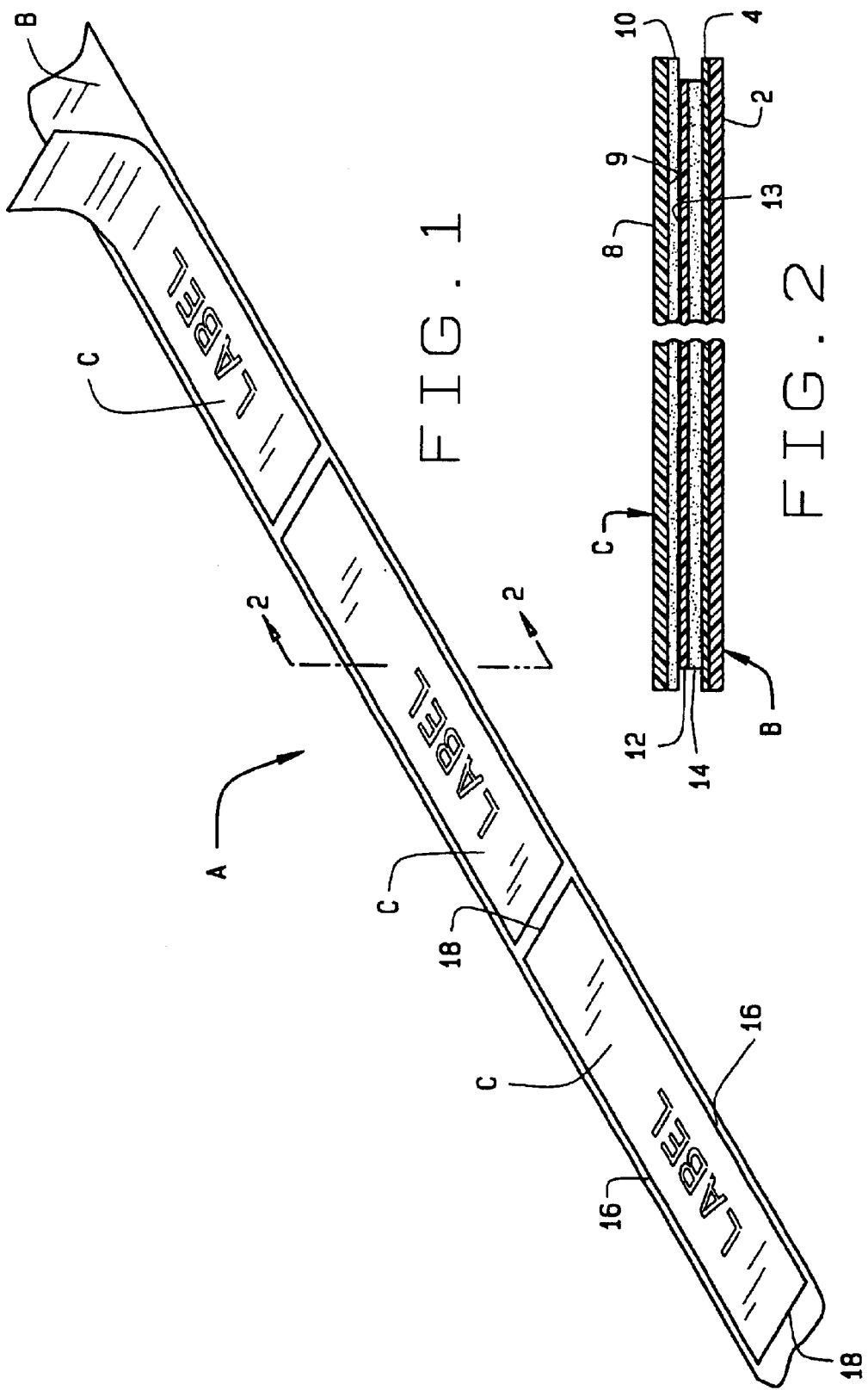

ADHESIVE-BACKED LABEL AND PROCESS FOR PRODUCING THE SAME

CROSS REFERENCE TO RELATED APPLICATIONS

STATEMENT REGARDING FEDERALLY SPONSORED RESEARCH OR DEVELOPMENT

BACKGROUND OF THE INVENTION

This invention relates in general to adhesive-backed labels, and more particularly, to labels of the type that use an adhesive with high peel strength and very low shear strength characteristics, such as are attached to the outer surface of a rubber tire.

Manufacturers print labels using "on-demand" printing technologies, thermal transfer printers, for example, and apply the labels to the products they produce, using automated application equipment. This equipment is commonly called a "print and apply" machine. These printed labels provide information concerning the products as well as warnings. For example, in the tire manufacturing industry, a so-called "tread label" may bear the tire manufacturer's trademark, the size of the tire, and perhaps a bar code identifying the tire. It may also have a warning relating to procedures for installing the tire on a wheel rim.

The typical label is die-cut from material that has a face sheet and a pressure sensitive adhesive spread over, or applied to, a back surface of the face sheet. The front surface of the face sheet has a print receptive coating on which information is printed or at least is exposed so that information may be printed on it. In most cases, the outer surface of the adhesive on the back surface of the face sheet is attached to a release liner. The release liner is normally formed from paper or film having a silicone or fluorocarbon release agent on one face, and the adhesive side of the face sheet is brought against the coated surface of the release liner. Thus, while the adhesive adheres to the release agent, it does so with less than a firm bond, so that the liner can be easily peeled back from the label.

Typically, the label is die-cut through the face sheet and the adhesive, but not through the liner. The labels lie end to end along the liner with slight spaces between successive labels and spaces between the side edges of the labels and the side edges of the liner. Face sheet and material outside the area of the label, commonly called the "matrix", is peeled away, leaving the labels attached to the liner with exposed areas of liner surrounding each label. Most commonly, the face sheet and the adhesive extend to all edges of each label. Less commonly, so-called "zone coated" adhesives result in labels with face sheet and adhesive extending to the leading and trailing edges only, while the face sheet extends beyond the adhesive on the side edges of each label. The liner with the labels attached to it is wound onto a cardboard or plastic core-holder to form a roll for storage, handling, and mounting on the print and apply machine.

In some industries, these labels must be applied to products made of certain low surface energy materials, or materials that excrete plasticizers and oils, or very coarse materials with deep pores. Examples include plastic containers, tire treads and carpet backing. For those products, typically labels are made with adhesives that flow into the products' surface pores and are chemically resistant to plasticizers and oils. In the case of labels applied to rubber tires, usually. Usually such an adhesive has a rubber base that enables it to adhere well to the treads of rubber tires and to other surfaces as well, but the rubber also allows the adhesive to flow at ambient temperatures. Adhesive flow at ambient temperature is called "cold flow", and an adhesive exhibiting such characteristics is sometimes hereinafter referred to as a "cold flow adhesive". An undesirable consequence of cold flow is that the adhesive exudes beyond the ends of the labels and becomes exposed on the web in the regions between successive labels. Then, when wound into a roll, the compressive force exerted on the labels of the convolutions, particularly the inner convolutions, intensifies the extrusion of the adhesive beyond the ends of the labels. Some adhesive may also exude from the sides of the labels. As a consequence, the exposed adhesive tends to bond the convolutions together and disrupt withdrawal of the liner and its labels from the roll. Just as detrimental, the exposed adhesive transfers to the rollers of print and apply machines, causing the liner and labels to wrap around the rollers and jam the machine. The exposed adhesive can also coat print heads and disrupt their operation.

DESCRIPTION OF THE INVENTION

In accordance with this invention, generally stated, a label is provided having a face sheet on which information may be printed, and an adhesive with cold flow characteristics, sometimes referred to as a transfer adhesive, along the back of the face sheet. The adhesive is positioned on a liner, and formed, as by die cutting, to closely predetermined dimensions. The peripheral edges of the face sheet are die-cut beyond the edges of the adhesive, producing a margin around the edges of the label so that if the adhesive exudes, it will not flow beyond the edges of the face sheet. The adhesive on the labels adheres to a release agent on the liner, with the labels being arranged one after the other on the liner, thus producing a web of labels. In addition, the present invention includes a process for producing the web. That process includes depositing a strip of transfer adhesive on a liner, die cutting the adhesive strip to produce a succession of adhesive patches with a matrix outside the patches, removing the matrix, placing over the patches and liner an outer strip of material suitable for the face sheets, and die cutting the outer strip beyond the margins of the adhesive patches.

In the preferred embodiment described, a layer of firm adhesive is applied to an undersurface of the outer strip. A film with two broad surfaces is adhered on one broad surface to the transfer adhesive layer before the transfer adhesive is die cut, and die cut with the adhesive, which makes the film coextensive with the patches of transfer adhesive. The other broad surface of the film is adhered to the firm adhesive. The firm adhesive extends beyond the edges of the film into the margin between the face sheet and the adhesive patches. The firm adhesive serves to adhere the edges of the label to the liner and to some extent, to the article to which the label is applied, and to the film. The film serves as reinforcement to the transfer adhesive, which, especially when very thin, tends to be fragile.

DESCRIPTION OF THE DRAWINGS

FIG. 1 is a perspective view of a portion of a web, including labels and a release liner, constructed in accordance with one illustrative embodiment of this invention;

FIG. 2 is a sectional view of the web taken along line 2—2 of FIG. 1;

DETAILED DESCRIPTION

Figure 3:
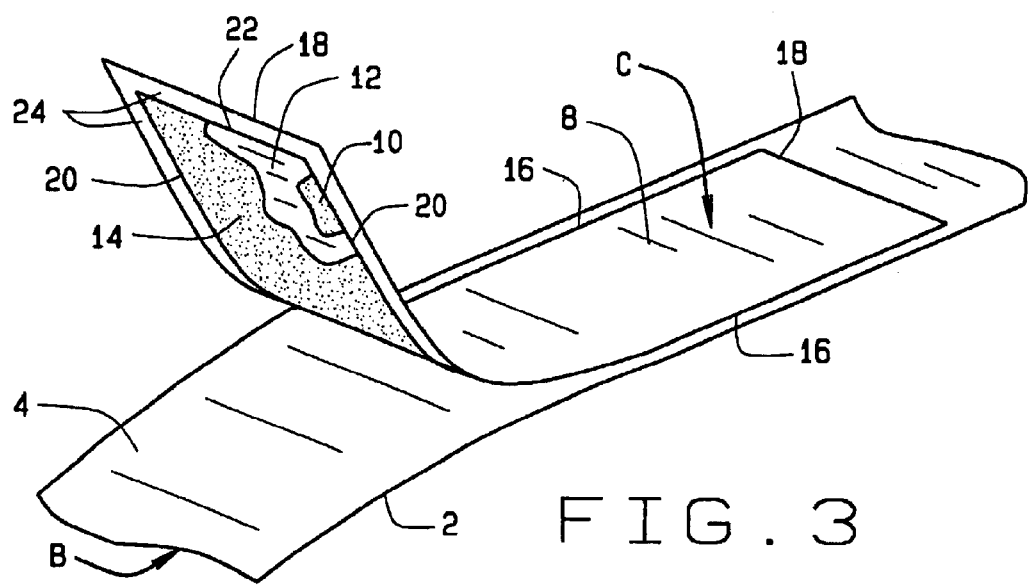
FIG. 3 is a fragmentary perspective view of the web with one of its labels partially peeled back from the liner.

Referring now to the drawings and particularly to FIGS. 1 and 2 for one illustrative embodiment of label of this invention, an extended web A includes a release liner B that extends the full length of the web A, and labels C which are carried by the liner B, one following the other, so that the labels C are located end to end on the liner B. As shown particularly in FIG. 2, in this embodiment, each label C constitutes a laminate comprising a face sheet 8 having a firm adhesive 10 on an undersurface 9. The laminate also contains a thin polyester film 12 that, along an upper surface 13, is bonded to the undersurface 9 of the face sheet 8 by the firm adhesive 10. On its lower surface, the film 12 has a layer 14 of rubber-based (cold flow) adhesive bonded to it. When the label C is part of the web A, the adhesive layer 14 adheres to release agent 4 on the release liner B, although with considerably less affinity than it adheres to the polyester film 12. Thus, the adhesive layer 14 attaches the label C to the liner B.

The labels C, then, are adhesively bonded to the liner, but the bond is not so strong that the liner B cannot easily be peeled back from the labels C. When a label C is removed from the liner B, the adhesive that holds the label C to the liner B is exposed so that the label C can be applied to some other surface, such as the tread of a tire. The labels C, on their exposed upper surfaces may have information printed on them.

Considering the release liner B, it includes (FIGS. 2 and 3) a paper or other flexible backing 2 and the release agent 4 on an inner face of backing 2. The backing 2 extends the full length and width of the web A and supports the labels C before they are removed. The release agent 4 is a silicone, fluorocarbon or other substance, which is applied as a coating to one face of the backing 2. It does not have a strong affinity for adhesives, so adhesives do not bond firmly to it and to the backing 2 which it covers.

The face sheet 8, which flexes easily, has side edges 16 and end edges 18 (FIG. 1) and is formed from a film, for example polyolefin or polyester or coated paper which will accept thermal transfer, laser, flexographic or other suitable printing. Information is printed on its exposed upper surface, in one of those manners or with ink in the traditional manner. Its undersurface 9 has the firm adhesive 10 bonded to it over its full area. The adhesive 10, in the form of a hard acrylic transfer or UV cured adhesive, for example, being firm, does not exhibit cold-flow characteristics as does the adhesive of the layer 14, and thus does not tend to ooze out or exude from beneath the face sheet 8, even when compressed. The face sheet 8 is slightly narrower than the release liner B and when the label C is on the release liner B, its side edges 16 lie slightly inwardly from the side edges of the release liner B, on the order of 1/32 inch.

The firm adhesive 10 on the undersurface of the face sheet 8 attaches the film 12 to the face sheet 8, with the adhesive layer 14 that is on the film 12 being presented away from face sheet 8. As shown in FIG. 3, the film 12 has side edges 20 and end edges 22 which are set inwardly from the side edges 16 and end edges 18 of the face sheet 8 and adhesive layer 10, preferably between 1/64 and 1/2 inches. The layer 14 of adhesive is coextensive with the edges 20 and 22, thereby providing a peripheral region 24 that is, at least initially, devoid of the adhesive that forms the layer 14. In the peripheral region 24 the firm adhesive 10 on the underface of the face sheet 8 is exposed to the liner B.

The adhesive layer 14 may range between 0.01 and 5.0 mils in thickness and preferably is about 2.0 mils thick. It covers the entire back surface of the film 12, that is the surface of the film 12 that is presented away from the face sheet 8, and as has been indicated, thus extends out to the side edges 20 and end edges 22 of the film 12. It has a considerably higher affinity for the film 12 than it does for the release agent 4 of the liner B, and thus can be peeled away from the liner B while remaining with the film 12 and the face sheet 8 to which the film 12 is bonded. Preferably, the adhesive of the layer 14 is rubber based, and as such is suitable for adhering to rubber surfaces such as the treads of tires. In any event, it will flow at ambient temperatures, that is to say it possesses cold flow characteristics, and thus tends to exude or ooze beyond the area to which it is initially applied. This characteristic becomes all the more pronounced when the adhesive layer 14 is compressed. G-1120 adhesive, which is sold by Emtech Emulsion Technology, is one example of a suitable adhesive of the layer 14. Being adhered to the liner B at the surface coated with the release agent 4, the adhesive 14 attaches the label C to the liner B, although releasably.

The web A is wound into a roll, and when so configured, the labels C are compressed between the convolutions formed by the liner B. This compresses the labels C and the adhesive layer 14 that attaches them to the liner B. As a consequence, the adhesive of the layer 14 may exude beyond the side edges 20 and end edges 22 of the film 12, but those edges 20 and 22 lie far enough inwardly from the side edges 16 and 18 of the face sheet 8 to prevent the exuded adhesive of the layer 14 from reaching the edges 16 and 18. Hence, the adhesive of the layer 14, even though it may exude or ooze beneath the peripheral region 24, always remains within the confines of the face sheet 8.

While the face sheets 8 of the labels C may be printed before the web A is wound into a roll, typically the roll contains blank labels C, that is labels C with no information printed on the front surfaces of the face sheets 8. Later, when labels C are required, the web A is withdrawn from the roll into which it was initially wound. As the web A pays off the roll it passes into a printing or print and apply machine which prints information on the exposed front faces of the face sheets 8, one label C after the other. Since the adhesive of the layer 14 remains entirely beneath the face sheet 8, even between the end edges 18 for the face sheets 8 of successive labels B, the adhesive cannot migrate onto the rollers and into the print head of the printing or print and apply machine, and thus does not interfere with the operation of the machine.

After the web A passes through the printing machine, the labels C are stripped from the release liner B and applied to a surface for which the adhesive of the layer 14 has a high affinity. Since the adhesive of the layer 14 has a low affinity for the release agent 4 that is coated over the paper backing 2 of the liner B, the liner B peels easily away from the labels C, with the adhesive layer 14 for each label fully intact behind the face sheet 8 of that label C. This leaves the adhesive layer 14 exposed so that it can be applied to another surface. Often, the label C is designed to remain only temporarily on the surface to which it is applied. For example, when the label C is adhered to the tread of a tire, it will remain with the tire as long as the tire remains in inventory. Once the tire is installed on a wheel rim, the label is removed. While the firm adhesive 10 may bond lightly to the tire, one can still easily peel the peripheral region 24 of the face sheet 8 back along any of its edges 16, 18 to acquire a firm enough grip on the face sheet 8 to pull the label away from the surface to which the adhesive of the layer 14 has adhered.

Figure 4A:
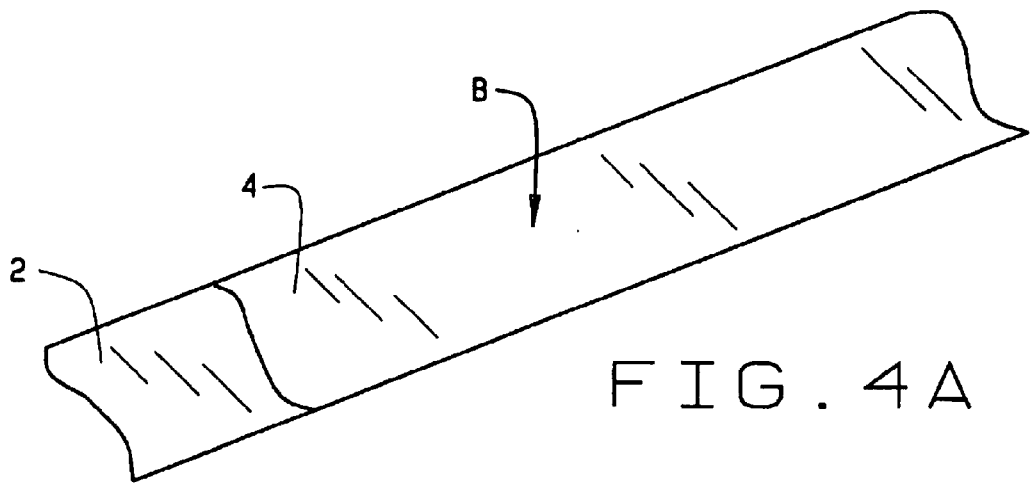
FIGS. 4A–4H are fragmentary perspective views illustrating schematically and in sequence steps employed in manufacturing the web.
Figure 4B:
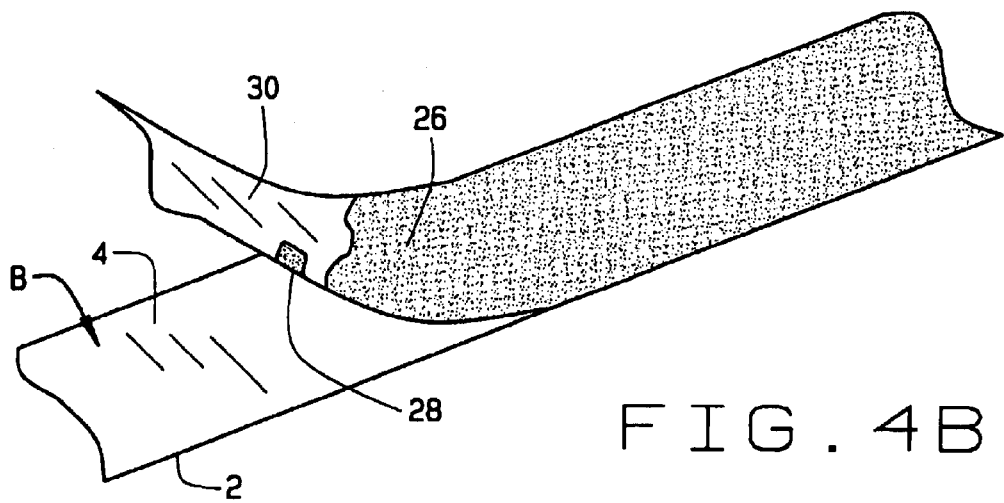
Figure 4C:
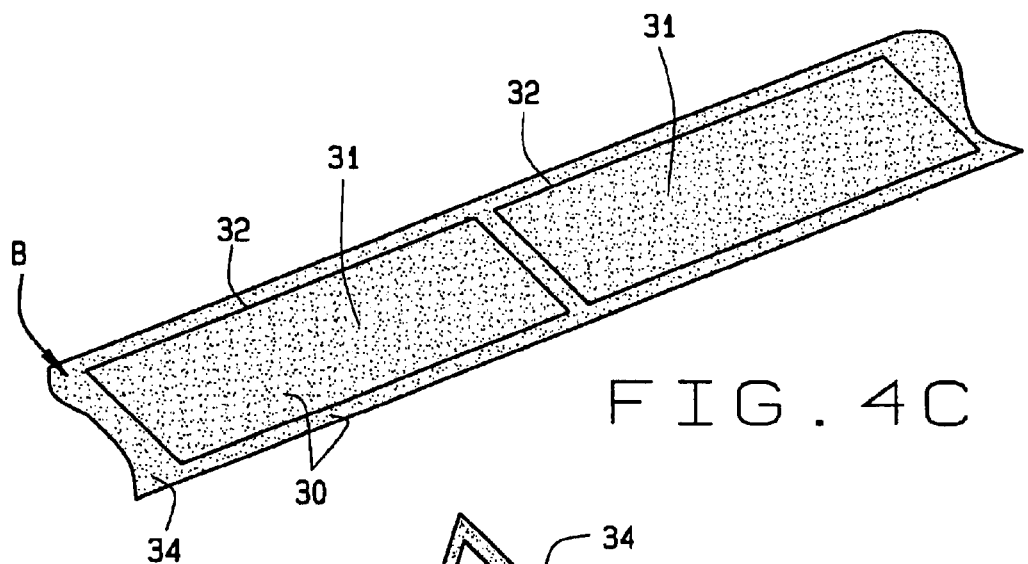
Figure 4D:
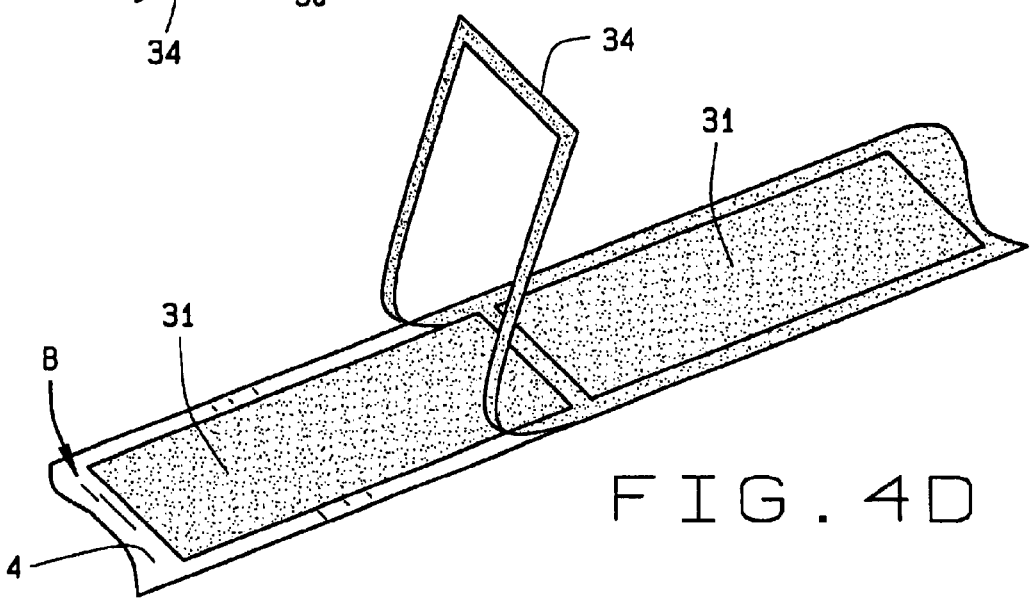
Figure 4E:
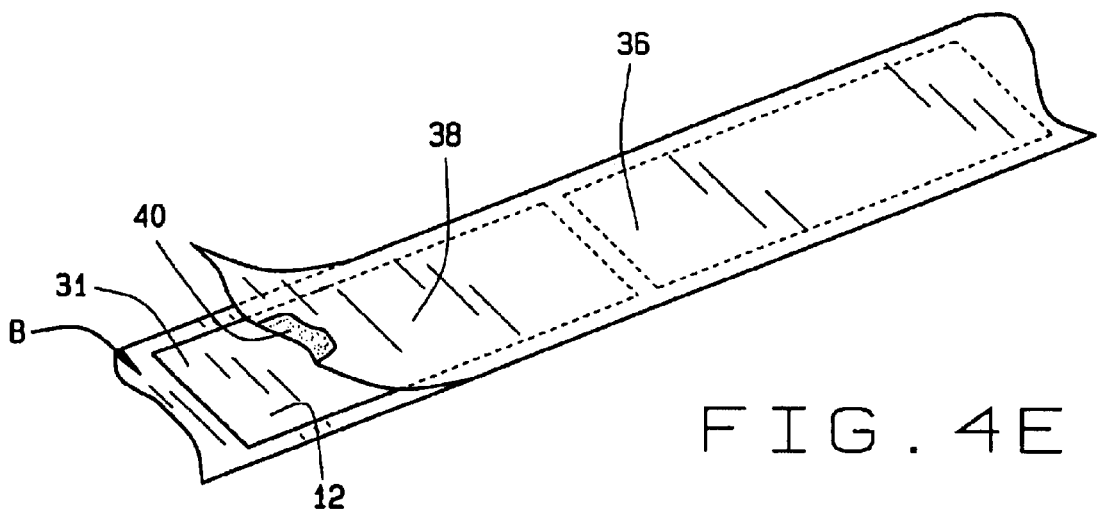
Figure 4F:
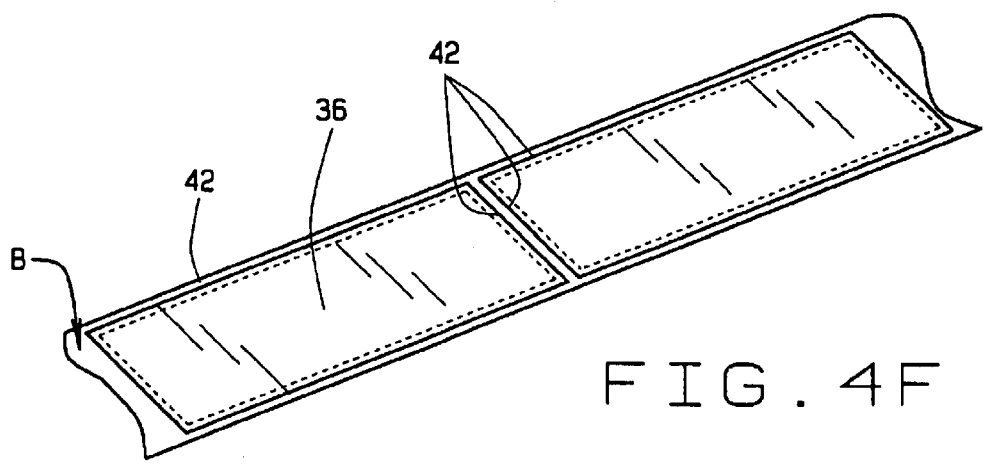
Figure 4G:
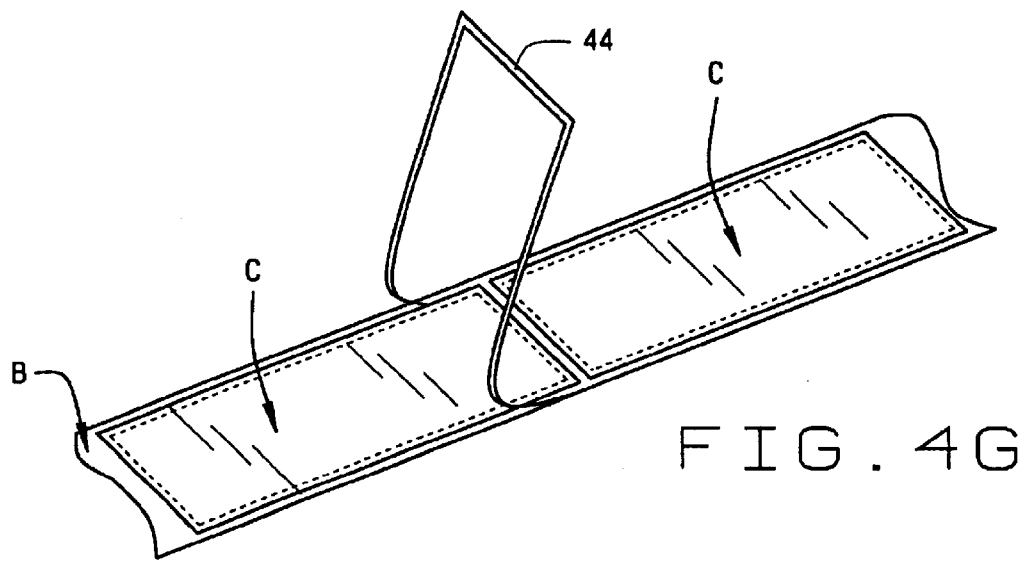
Figure 4H:
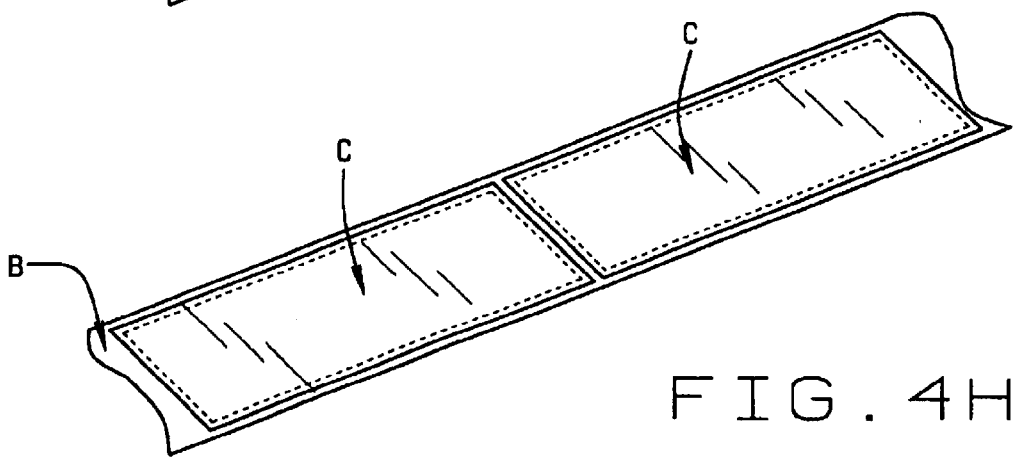

The procedure for producing the web A (FIG. 4) begins with the application of a strip 26 of transfer adhesive to the liner B (FIGS. 4A, B). The strip 26, which is essentially continuous and as wide as the liner B, includes an adhesive layer 28 and a thin plastic film 30 over the adhesive layer 28. The adhesive layer 28 bonds to the release agent 4 on the inner surface of the liner B, although releasably. The film 30 is thus on a surface of the adhesive layer 28 away from the liner B (FIG. 4B). The adhesive of the adhesive layer 28 is the same as the adhesive of the layer 14 for the labels C, and likewise the film 30 is the same as the film 12 of the labels C except for size. The adhesive layer 28 and the film 30 extend essentially the full width of the liner B and are continuous. They later become a succession of patches 31, each having an adhesive layer 14 and an overlying film 12 (FIGS. 4C, D). The strip 26 of transfer adhesive is available on the market.

The conversion of the strip 26 of transfer adhesive into the individual patches 31 of adhesive layer 14 and film 12 that are later embodied in the labels C is accomplished by a die cutting operation. Preferably, the liner B with the transfer strip 26 adhered to it is passed through a roller die configured to conform to the film 12 and adhesive layer 14 of each label C. The die produces cuts 32 (FIG. 4C) that extend through the film 12 and through the adhesive layer 14, down to, but not into, the paper backing 2 of the liner B. Each cut 32 circumscribes the film 12 and adhesive layer 14 for a different label C. The portion of transfer strip 26 that lies outside the cuts 32 forms a matrix 34.

Next the matrix 34 formed by the die cuts 32 is removed (FIG. 4D), that is to say, is peeled away from the release agent 4 on the liner B, leaving only the patches 31 which represent the film 12 and adhesive 14 for individual labels C. Machines are available for removing the matrix, one such machine being sold by Mark Andy.

After the matrix 34 is removed, an outer strip 36 (FIG. 4E) of flexible face sheet material is laid down over liner B and the patches 31 of adhesive layer 14 and film 12 that are upon it. The outer strip 36 includes a face sheet 38 and a firm adhesive 40 on its under surface. The face sheet 38 is the same material as that of the face sheets 8 in the labels C and likewise the adhesive 40 is the same adhesive as the adhesive 10 for the individual labels C, except for size. In this regard, the outer strip 36, composed of the face sheet 38 and the firm adhesive 40, is as wide as the liner B and essentially continuous. The outer strip 36 thus lies over the successive patches 31 of film 12 and adhesive layer 14 on the liner B as well as over the exposed regions of release agent 4 on the liner B, with its firm adhesive 40 presented toward those patches 31 and the liner B and with its side edges generally in registration with the side edges of the liner B. As the outer strip 36 is deposited on the patches 31 and liner B, the firm adhesive 40 bonds the film 12 on the patches 31 along the liner B. If the adhesive 40 requires activation, such as by ultraviolet radiation or heat, it is activated at this time. In any event, the firm adhesive 40 bonds the face sheet 38 of the outer strip 36 firmly to the film 12 on the successive patches 31 that lie along the liner B, and to a lesser extent adheres the strip 36 to the release agent 4 on the liner B as well.

Once the outer strip 36 is in place over the patches 31 and the liner B, it too is subjected to die cutting, preferably with a roller die, that imparts to outer strip 36 cuts 42 (FIG. 4F) that lie beyond edges of the patches 31. The cut 42 around each patch 31 lies outwardly from the margins of the patch 31 between 1/64 and 1/2 inches and preferably about 3/32 inches. The cuts 42 extend through the face sheet 38 and firm adhesive 40 on the outer strip 36, but not into the liner B. They correspond in size to the face sheets 8 of the individual labels C, and transform the outer strip 36 into face sheets 8 for successive labels C and into a surrounding outer matrix 44.

At this juncture the matrix 44 may be stripped from the liner B in the same manner as was inner matrix 34 (FIG. 4G), or it may be left adhered to the release agent 4 of the liner B.

Finally, the face sheets 8 on the liner B may be printed with suitable information, so that the web A is delivered to the customer with its labels C printed. On the other hand, the web A may be delivered to a customer with the face sheets 8 of its labels C blank (FIG. 4H), so that the customer can print the information.

The adhesive 28 of the strip 26 of transfer adhesive may be reinforced, such as with fibers, to render it somewhat stiffer. When so constituted, the film 30 (12) may be eliminated and the reinforced adhesive bonded directly to the outer strip 36, even to the undersurface of the face sheet 38 (8) in the outer strip 36, thus eliminating the firm adhesive 40 (10).

Substances other than polyester may be used as the film 30 on the strip 26 of transfer adhesive and likewise the film 12 of each label C. Suitable substances include other polymers such as polypropylene and polyethylene. The firm adhesive can be of the type sold by Emtech as P1212, or by Northwest Coatings as 18373, or by 3M as 9458, or those U.V. curing acrylic adhesives, either solvent or water based, that are well known in the art. The cold flow or transfer adhesive can be Emtech G 1120, Emtech G 1110, or other suitable rubber based transfer adhesive, as will be apparent to those skilled in the art. As has been indicated, various changes in the steps of the process, and in the resultant article can be made, depending upon the characteristics or thickness of the cold flow adhesive, but in any event, forming the patches 31 to close predetermined dimensions, inboard of the margins of the labels, as by die cutting of the strip of adhesive 14, is important. These variations are merely illustrative.

What is claimed is:

1. A label comprising: a face sheet having an outer surface, an undersurface, and side and end margins, and a layer of cold flow, transfer adhesive located along the undersurface of the face sheet, said adhesive layer being die cut to define side and end margins that are set inwardly, respectively, from the side and end margins of the face sheet, so that the face sheet, beyond said adhesive layer, has a peripheral region that is devoid of said cold flow adhesive, whereby said cold flow adhesive can exude outwardly into the peripheral region, while still remaining behind the face sheet.

2. A label according to claim 1 wherein side and end edges of the adhesive layer are set inwardly from the side and end edges of the face sheet between 1/64 and 1/2 inches.

3. A label according to claim 2 wherein the face sheet is formed from a printable material.

* * * * *